US012561793B2

(12) United States Patent
Tal et al.

(10) Patent No.: US 12,561,793 B2
(45) Date of Patent: Feb. 24, 2026

(54) MACHINE LEARNING BASED EXAMINATION FOR PROCESS MONITORING

(71) Applicant: Applied Materials Israel Ltd., Rehovot (IL)

(72) Inventors: Noam Tal, Kiryat Ono (IL); Boris Levant, Rehovot (IL); Sergey Sinitsa, Holon (IL); Boaz Sturlesi, Tel Aviv (IL); Shay Yogev, Kibbutz Kfar Menachem (IL); Assaf Ariel, Shoresh (IL); Lilach Choona, Rehovot (IL); Shaul Pres, Tel Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 352 days.

(21) Appl. No.: 18/113,032

(22) Filed: Feb. 22, 2023

(65) Prior Publication Data

US 2024/0281956 A1 Aug. 22, 2024

(51) Int. Cl.
| | |
|---|---|
| G06T 7/00 | (2017.01) |
| G01N 21/88 | (2006.01) |
| G06V 10/44 | (2022.01) |
| G06V 10/70 | (2022.01) |

(52) U.S. Cl.
CPC ....... G06T 7/0008 (2013.01); G01N 21/8851 (2013.01); G06V 10/44 (2022.01); G06V 10/70 (2022.01); *G06T 2207/20081* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 4,805,123 A | * | 2/1989 | Specht | G06T 7/001 |
| | | | | 356/394 |
| 9,553,034 B1 | * | 1/2017 | Young | H01L 22/12 |
| 10,789,703 B2 | * | 9/2020 | Lu | G06T 7/0004 |
| 2005/0026054 A1 | * | 2/2005 | Yang | G03F 7/70608 |
| | | | | 430/30 |
| 2006/0201616 A1 | * | 9/2006 | Matsuoka | G03F 7/3021 |
| | | | | 156/272.2 |

(Continued)

*Primary Examiner* — Soo Shin
(74) *Attorney, Agent, or Firm* — Lowenstein Sandler LLP

(57) ABSTRACT

There is provided a system and method of examination of semiconductor specimens. The method includes generating a sequence of anomaly scores corresponding to a sequence of specimens sequentially fabricated and examined during a fabrication process, comprising, for each given specimen: obtaining an image of the given specimen acquired by an examination tool; using a machine learning (ML) model to process the image and obtaining an anomaly map indicative of pattern variation in the image; and deriving, based on the anomaly map, an anomaly score indicative of level of pattern variation presented in the given specimen, wherein the anomaly score is correlated with a defectivity score related to defect detection in a correlation relationship, and has higher detection sensitivity than the defectivity score; and analyzing the sequence of anomaly scores to monitor on-going process stability, thereby providing defect related prediction along the fabrication process based on the correlation relationship.

20 Claims, 6 Drawing Sheets

(56)　　　　　References Cited

U.S. PATENT DOCUMENTS

| | | | |
|---|---|---|---|
| 2007/0230770 A1* | 10/2007 | Kulkarni | G06T 7/33 |
| | | | 382/149 |
| 2011/0054659 A1* | 3/2011 | Carlson | H01L 21/67253 |
| | | | 700/109 |
| 2011/0224932 A1* | 9/2011 | Huet | G01R 31/2656 |
| | | | 702/81 |
| 2020/0134773 A1* | 4/2020 | Pinter | G01N 21/8806 |
| 2021/0247324 A1* | 8/2021 | Naruse | G06N 3/045 |
| 2021/0299879 A1* | 9/2021 | Pinter | B25J 9/1697 |
| 2025/0069958 A1* | 2/2025 | Buxbaum | H01J 37/265 |

* cited by examiner

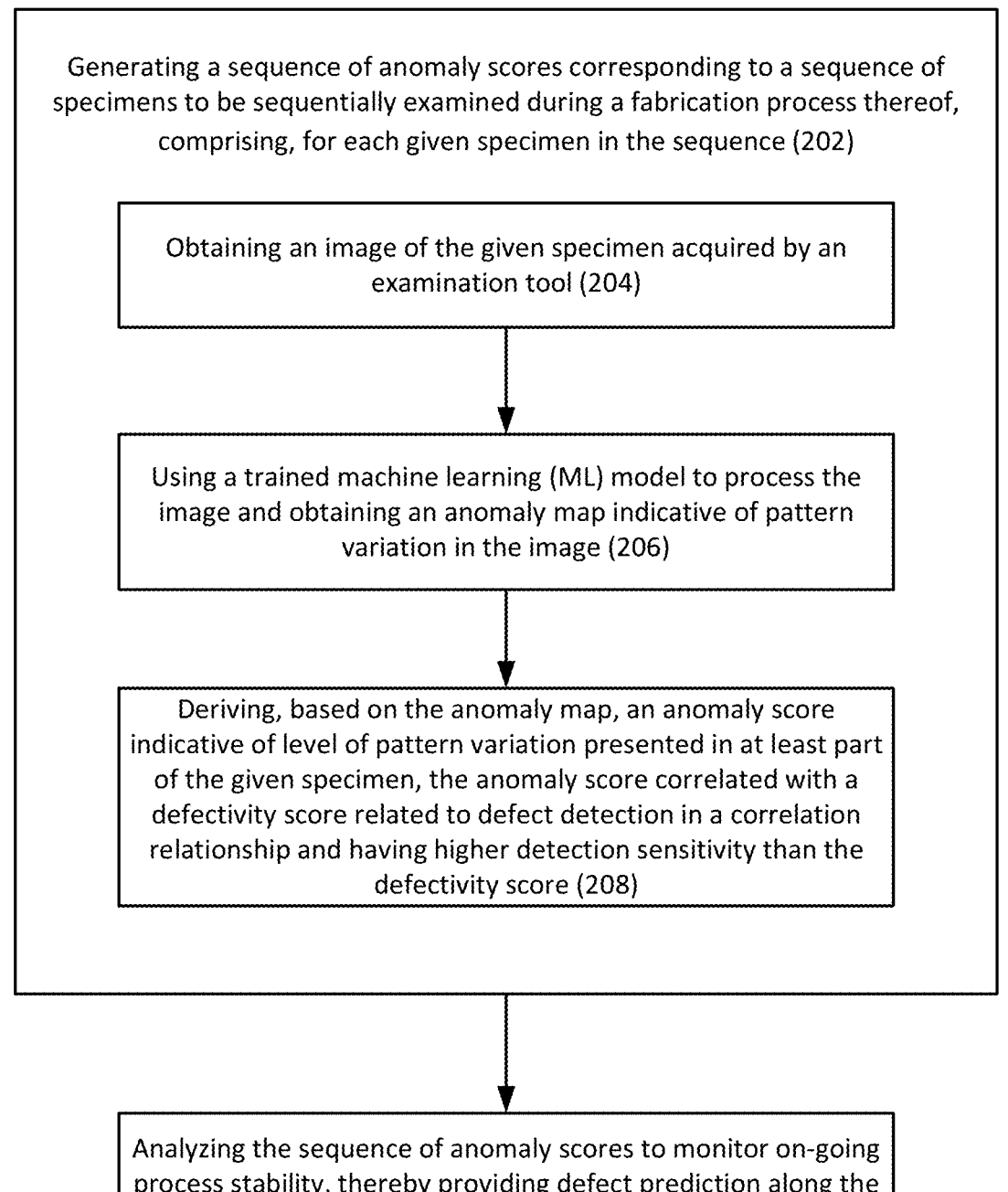

Generating a sequence of anomaly scores corresponding to a sequence of specimens to be sequentially examined during a fabrication process thereof, comprising, for each given specimen in the sequence (202)

Obtaining an image of the given specimen acquired by an examination tool (204)

Using a trained machine learning (ML) model to process the image and obtaining an anomaly map indicative of pattern variation in the image (206)

Deriving, based on the anomaly map, an anomaly score indicative of level of pattern variation presented in at least part of the given specimen, the anomaly score correlated with a defectivity score related to defect detection in a correlation relationship and having higher detection sensitivity than the defectivity score (208)

Analyzing the sequence of anomaly scores to monitor on-going process stability, thereby providing defect prediction along the fabrication process based on the correlation relationship (210)

FIG. 2

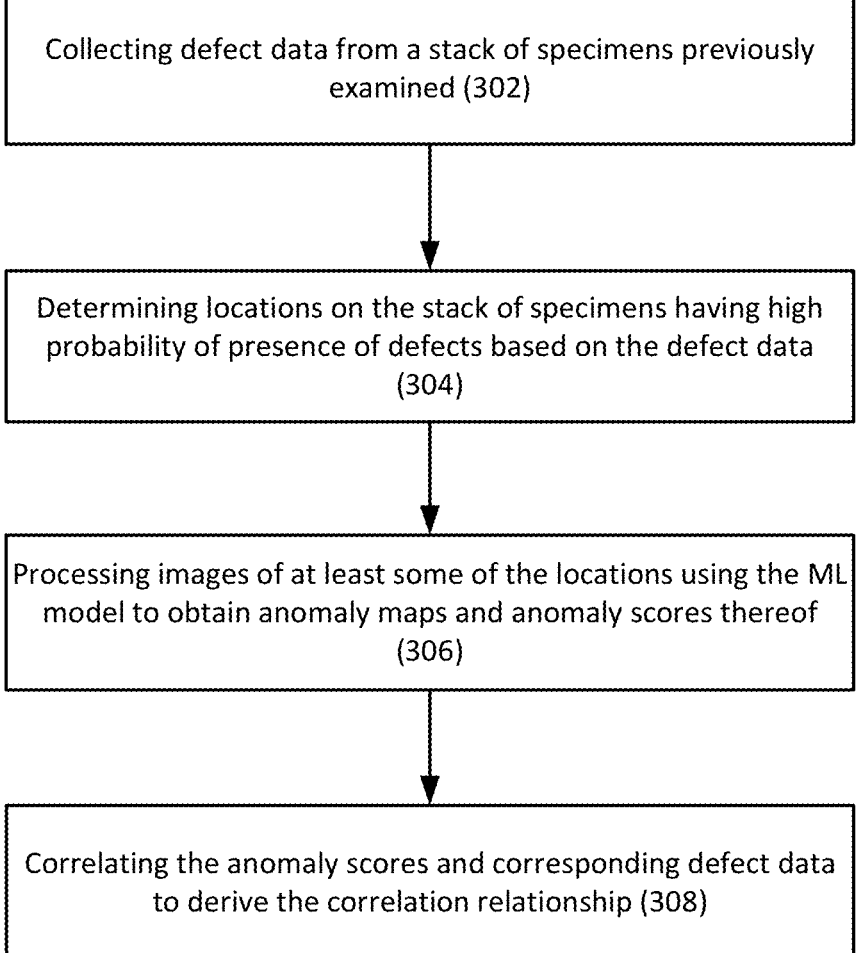

Collecting defect data from a stack of specimens previously examined (302)

Determining locations on the stack of specimens having high probability of presence of defects based on the defect data (304)

Processing images of at least some of the locations using the ML model to obtain anomaly maps and anomaly scores thereof (306)

Correlating the anomaly scores and corresponding defect data to derive the correlation relationship (308)

FIG. 3

MACHINE LEARNING BASED EXAMINATION FOR PROCESS MONITORING

TECHNICAL FIELD

The presently disclosed subject matter relates, in general, to the field of examination of a semiconductor specimen, and more specifically, to machine learning based examination for process monitoring.

BACKGROUND

Current demands for high density and performance, associated with ultra large-scale integration of fabricated devices, require submicron features, increased transistor and circuit speeds, and improved reliability. As semiconductor processes progress, pattern dimensions, such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures, such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for the purpose of process control, such as, e.g., defect related operations, as well as metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected, and provide useful information on adjustments that may be needed to the manufacturing tools, equipment and/or compositions, depending on the type of defects identified. In some cases, machine learning technologies can be used to assist the automated examination process so as to promote higher performance.

SUMMARY

In accordance with certain aspects of the presently disclosed subject matter, there is provided a computerized system of examining semiconductor specimens, the system comprising a processing and memory circuitry (PMC) configured to: generate a sequence of anomaly scores corresponding to a sequence of specimens sequentially fabricated and examined during a fabrication process thereof, comprising, for each given specimen: obtaining an image of the given specimen acquired by an examination tool; using a machine learning (ML) model to process the image and obtain an anomaly map indicative of pattern variation in the image; and deriving, based on the anomaly map, an anomaly score indicative of level of pattern variation presented in at least part of the given specimen, wherein the anomaly score is correlated with a defectivity score related to defect detection in a correlation relationship, and has higher detection sensitivity than the defectivity score; and analyze the sequence of anomaly scores to monitor on-going process stability, thereby providing defect related prediction along the fabrication process based on the correlation relationship.

In addition to the above features, the system according to this aspect of the presently disclosed subject matter can comprise one or more of features (i) to (x) listed below, in any desired combination or permutation which is technically possible: (i). The pattern variation relates to at least one of: bent lines, edge roughness, surface roughness, critical dimension (CD) variation, missing patterns, and gray level variation.

(ii). The ML model is previously trained using unsupervised learning based on a training set comprising a plurality of training images of which the majority represents normal pattern behaviors.

(iii). The defectivity score is obtained in accordance with a defectivity metric representing a defect characteristic.

(iv). The correlation relationship is derived by: collecting defect data from a stack of specimens previously examined, determining locations on the stack of specimens having high probability of presence of defects based on the defect data, processing images of at least some of the locations using the ML, model to obtain anomaly maps and anomaly scores thereof, and correlating the anomaly scores and corresponding defect data to derive the correlation relationship.

(v). The sequence of specimens is a sequence of dies on a wafer, and the sequence of anomaly scores are analyzed for monitoring pattern variation uniformity across the wafer.

(vi). The sequence of specimens is a sequence of wafers, and the sequence of anomaly scores are analyzed for monitoring process variation along the fabrication process of the sequence of wafers.

(vii). The sequence of specimens comprises a plurality of subsequences of specimens respectively fabricated by a plurality of fabrication tools. The generating comprises generating a plurality of subsequences of anomaly scores corresponding to the plurality of subsequences of specimens. The analyzing comprises separately and collectively analyzing the plurality of subsequences of anomaly scores to verify the root cause of one or more pattern variations indicated by one or more anomaly scores.

(viii). The anomaly map comprises pixel level probabilities of the presence of pattern variation in the image, and the anomaly score is derived based on the anomaly map for one of one or more pixels in the image, one or more structures represented in the image, or the image as a whole.

(ix). In some cases, the ML model can be implemented as a generative network, such as, e.g., a variational autoencoder (VAE), that is configured to map the image to one or more latent variables in a latent space, each representing a respective feature extracted from the image, and model a probability distribution of each feature, thereby allowing to visualize different levels of pattern variations impacting the feature.

(x). At least one latent variable in the latent space represents a specific pattern variation of a structure in the image. The PMC is further configured to provide an indication of the level of pattern variation of the structure based on a value of the at least one latent variable extracted from the latent space and the probability distribution of the specific pattern variation, and determine the level of pattern variation of the structure based on the indication and the anomaly score derived for the structure.

In accordance with other aspects of the presently disclosed subject matter, there is provided a method of examining semiconductor specimens, the method performed by a processor and memory circuitry (PMC) and comprising: generating a sequence of anomaly scores corresponding to a sequence of specimens sequentially fabricated and examined during a fabrication process thereof, comprising, for each given specimen: obtaining an image of the given specimen acquired by an examination tool; using a machine learning (ML) model to process the image and obtaining an anomaly map indicative of pattern variation in the image; and deriving, based on the anomaly map, an anomaly score indicative of level of pattern variation presented in at least part of the given specimen, wherein the anomaly score is correlated with a defectivity score related to defect detection in a correlation relationship, and has higher detection sensitivity than the defectivity score; and analyzing the sequence of anomaly scores to monitor on-going process stability, thereby providing defect related prediction along the fabrication process based on the correlation relationship.

These aspects of the disclosed subject matter can comprise one or more of features (i) to (x) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examining semiconductor specimens, the method comprising: generating a sequence of anomaly scores corresponding to a sequence of specimens sequentially fabricated and examined during a fabrication process thereof, comprising, for each given specimen: obtaining an image of the given specimen acquired by an examination tool; using a machine learning (ML) model to process the image and obtaining an anomaly map indicative of pattern variation in the image; and deriving, based on the anomaly map, an anomaly score indicative of level of pattern variation presented in at least part of the given specimen, wherein the anomaly score is correlated with a defectivity score related to defect detection in a correlation relationship, and has higher detection sensitivity than the defectivity score; and analyzing the sequence of anomaly scores to monitor on-going process stability, thereby providing defect related prediction along the fabrication process based on the correlation relationship.

These aspects of the disclosed subject matter can comprise one or more of features (i) to (x) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 2 illustrates a generalized flowchart of monitoring process stability in accordance with certain embodiments of the presently disclosed subject matter.

FIG. 3 illustrates a generalized flowchart of deriving a correlation relationship between a defectivity metric and an anomaly metric in accordance with certain embodiments of the presently disclosed subject matter.

DETAILED DESCRIPTION OF EMBODIMENTS

Figure 1:
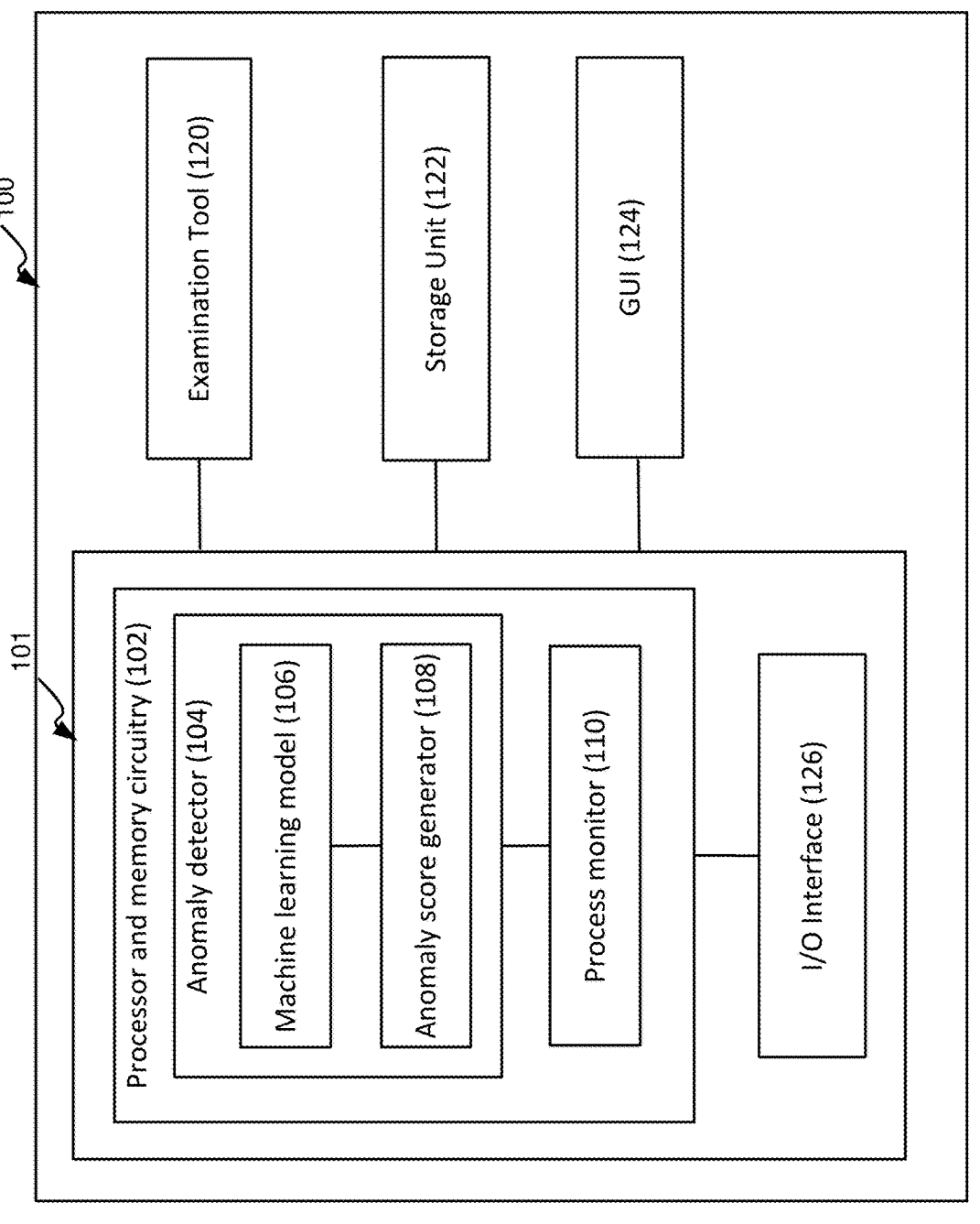
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "generating", "using", "obtaining", "processing", "training", "acquiring", "deriving", "collecting", "determining", "monitoring", "analyzing", "providing", "correlating", "mapping", "modeling", "allowing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the process monitoring system, the training system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as a "false alarm"

defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment.

Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The process of semiconductor fabrication often requires multiple sequential processing steps/layers, each one of which could possibly cause errors that may lead to yield loss. Examples of various processing steps can include lithography, etching, depositing, planarization, growth (such as, e.g., epitaxial growth), and implantation, etc. Various in-line examination operations, such as defect-related examination, and/or metrology-related examination, can be performed at different processing steps/layers during the fabrication process to monitor and control the process. The examination operations can be performed a multiplicity of times, for example after certain processing steps/layers, or the like.

Run-time defect examination conventionally employs a two-phase procedure, e.g., inspection of a specimen to detect potential defects, followed by review of sampled locations of the potential defects. Examination generally involves generating certain output (e.g., images, signals, etc.) for a specimen by directing light or electrons to the wafer and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having high probability of being a defect. Different detection methodologies can be applied in the defect detection module for processing the inspection images and generating the defect map, such as Die-to-Die (D2D), Die-to-History (D2H), Die-to-Database (D2DB), etc. By way of example, a difference image can be generated based on the difference between pixel values of an inspection image and pixel values derived from one or more reference images. The defect map can be generated by determining locations of suspected defects based on the difference image using a detection threshold. During the second phase, at least some of the suspected locations in the defect map are more thoroughly analyzed with relatively high resolution, for determining different parameters of the defects, such as classes, thickness, roughness, size, and so on.

Figure 4:
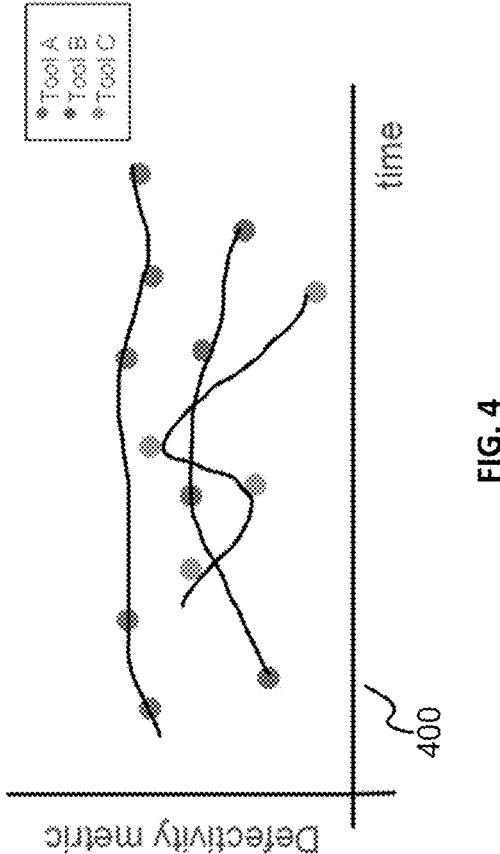
FIG. 4 illustrates an exemplary defectivity metric graph in accordance with certain embodiments of the presently disclosed subject matter.

A defectivity metric related to defect detection represents certain defect characteristics, such as, e.g., defect density (also referred to as defect hit rate), defect count, etc., can be calculated for each semiconductor specimen manufactured in the production line of the fab and used as an indicator for monitoring an on-going trend of defect presence in the fabrication process. An exemplary defectivity metric graph is illustrated in FIG. 4 in accordance with certain embodiments of the presently disclosed subject matter.

The graph 400 illustrates changes of a defectivity metric (e.g., defect density) of a sequence of semiconductor specimens (e.g., wafers) fabricated along a time axis. The three curves reflect data collected from three fabrication tools A, B and C in the Fab. Each curve connects multiple points, each representing a respective specimen manufactured at a specific time point in the production line. As shown, the curves can provide an on-going trend of defect presence on the sequence of specimens, when there are sufficient appearances of defects on the specimens (e.g., with a normal hit rate). Such a graph can be used to monitor the fabrication process and provide a reasonable prediction of defect presence for the next wafers in line to be fabricated and examined. In some cases, an early alert of a possible yield drop can be provided when a trend of increasing defect presence is detected.

However, as true defects, in particular certain types of low frequency defects, are, due to their nature, very rare and sparse in distribution as compared to nuisances, in some cases there may not be enough defect data available for constructing a meaningful defectivity metric graph. By way of example, it may be the case that very few wafers in the production line have the presence of certain specific defects, which causes the corresponding defectivity metric graph to be too sparse to be used for monitoring the fabrication process and providing any meaningful indication/prediction.

Accordingly, certain embodiments of the presently disclosed subject matter propose a system and method capable of providing continuous process monitoring for semiconductor specimens in the production line and providing defect related prediction along the fabrication process. Specifically, the images of the specimens can be processed by a ML model to obtain anomaly maps thereof, and anomaly scores can be derived based on the anomaly maps, representative of level of pattern variations in the images. In particular, the anomaly scores are correlated with defectivity scores (which can be in accordance with the defectivity metric as described above), and have higher detection sensitivity than the defectivity scores. Analyzing the sequence of anomaly scores at an on-going basis enables providing continuous process monitoring and deriving defect related prediction based on the correlation therebetween, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification of various types, segmentation, and/or metrology operations, such as, e.g., critical dimension (CD) measurements, overlay (OVL), etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning, imaging, sampling, reviewing, measuring, classifying and/or other processes provided with regard to the specimen or parts thereof. The examination tools 120 can be implemented as machines of various types. In some embodiments, the examination tool can be implemented as an electron beam machine/tool, such as e.g., Scanning Electron Microscope (SEM), Atomic Force Microscopy (AFM), or Transmission Electron Microscope (TEM), etc.

By way of example, scanning electron microscopes (SEM) is a type of electron microscope that produces images of a specimen by scanning the specimen with a focused beam of electrons. An SEM is capable of accurately inspecting and measuring features during the manufacture of semiconductor wafers. The electrons interact with atoms in the specimen, producing various signals that contain information on the surface topography and/or composition of the specimen.

According to certain embodiments, the examination tool 120 can include one or more inspection tools and/or one or more review tools. The inspection tools can scan the specimen to capture inspection images and detect potential defects in accordance with a defect detection algorithm. The output of the detection module is a defect map indicative of defect candidate distribution on the semiconductor specimen. The review tools can be configured to capture review images at locations of the defect candidates in the map, and review the review images for ascertaining whether a defect candidate is indeed a DOI. In some cases, at least one of the examination tools 120 has metrology capabilities. Such an examination tool is also referred to as a metrology tool. The metrology tool can be configured to generate image data in response to scanning the specimen and perform metrology operations based on the image data.

In some cases, the same examination tool can provide low-resolution image data and high-resolution image data. The resulting image data can be transmitted—directly or via one or more intermediate systems—to system 101. The present disclosure is not limited to any specific type of examination tools and/or the representation/resolution of image data resulting from the examination tools.

According to certain embodiments of the presently disclosed subject matter, the examination system 100 comprises a computer-based system 101 operatively connected to the examination tools 120 and capable of process monitoring based on machine learning (ML). In some embodiments, system 101 can be configured to monitor process stability in runtime using a trained machine learning model based on runtime images of semiconductor specimens obtained during a fabrication process thereof. Such a system 101 is also referred to as a process monitoring system. In some embodiments, system 101 can be configured as a training system capable of training the above-mentioned ML model during a training/setup phase using a specifically generated training set.

System 101 includes a processor and memory circuitry (PMC) 102 operatively connected to a hardware-based I/O interface 126. PMC 102 is configured to provide processing necessary for operating the system as further detailed with reference to FIGS. 2-3 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

According to certain embodiments, system 101 can be configured to monitor process stability in runtime based on runtime images of a sequence of specimens which are sequentially fabricated and examined in the fab during a fabrication process thereof. In such cases, one or more functional modules comprised in PMC 102 can include an anomaly detector 104 and a process monitor 110. The anomaly detector 104 includes a machine learning (ML) model 106 which has been previously trained in a training phase for pattern variation detection, and an anomaly score generator 108.

The anomaly detector 104 can be configured to generate a sequence of anomaly scores corresponding to a sequence of specimens. Specifically, for each given specimen in the sequence, an image of the given specimen (e.g., acquired by the examination tool 120) can be obtained and fed into the ML model 106. The ML model 106 can be used to process the image and obtain an anomaly map indicative of pattern variation in the image. The anomaly score generator 108 can be configured to derive, based on the anomaly map, an anomaly score indicative of level of pattern variation presented in at least part of the given specimen. The anomaly score is correlated with a defectivity score related to defect detection in a correlation relationship and has higher detection sensitivity than the defectivity score. The process monitor 110 can be configured to analyze the sequence of anomaly scores to monitor on-going process stability, thereby providing defect related prediction along the fabrication process based on the correlation relationship.

As aforementioned, in certain embodiments, system 101 can be configured as a training system capable of training an ML model during a training/setup phase. In such cases, functional modules comprised in PMC 102 can include a training set generator (not illustrated), a training module (not illustrated), and a machine learning model 106. The training set generator can be configured to obtain a training set comprising a plurality of training images, the majority of which represent normal pattern behaviors. The training module can be configured to train the ML model 106 using the training set. The ML model, upon being trained, is usable to perform pattern variation detection in runtime based on runtime images of semiconductor specimens to be examined (i.e., production specimens).

Operation of system 101, PMC 102 and the functional modules therein will be further detailed with reference to FIGS. 2-3.

According to certain embodiments, the ML model 106 referred to herein can be implemented as various types of machine learning models, such as, e.g., Artificial Neural Network (ANN), principal component analysis (PCA) models, or dimensional transformation models, etc. The learning algorithm used by the ML model can be any of the following: supervised learning, unsupervised learning, or semi-supervised learning, etc. The presently disclosed subject matter is not limited to the specific type of ML model or the specific type or learning algorithm used by the ML model.

In some embodiments, the ML model can be implemented as a deep neural network (DNN). DNN can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized into a plurality of DNN sub-networks. Each layer of DNN can include multiple basic computational elements (CE) typically referred to in the art as dimensions, neurons, or nodes. An exemplary DNN structure is described below for purpose of exemplification and illustration.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a deep neural network is referred to as a training set.

It is noted that the teachings of the presently disclosed subject matter are not bound by specific architecture of the ML or DNN as described above.

In some cases, additionally to system 101, the examination system 100 can comprise one or more examination modules, such as, e.g., defect detection module and/or Automatic Defect Review Module (ADR) and/or Automatic Defect Classification Module (ADC) and/or a metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the anomaly maps and/or scores, the defect related prediction, etc., can be provided to the one or more examination modules for further processing. In some cases, the ML model 106 can be comprised in the one or more examination modules. Optionally, the ML model 106 can be shared between the examination modules or, alternatively, each of the one or more examination modules can comprise its own ML model 106.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store runtime images/training images and/or derivatives thereof produced by the examination tool 120. Accordingly, the images can be retrieved from the storage unit 122 and provided to the PMC 102 for further processing.

In some embodiments, system 101 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., the configuration of the ML model, etc. The user may also view the operation results, such as, e.g., the anomaly maps and/or scores, defect prediction, on the GUI.

In some cases, system 101 can be further configured to send, via I/O interface 126, the results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. By way of example, the examination tool 120 and the system 101 can be located at the same entity (in some cases hosted by the same device) or distributed over different entities, depending on specific system configurations and implementation needs.

It is further noted that in other embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operation of systems 101 and 100 can correspond to some or all of the stages of the methods described with respect to FIGS. 2-3. Likewise, the methods described with respect to FIGS. 2-3 and their possible implementations can be implemented by systems 101 and 100. It is therefore noted that embodiments discussed in relation to the methods described with respect to FIGS. 2-3 can also be implemented, mutatis mutandis as various embodiments of the systems 101 and 100, and vice versa.

Referring to FIG. 2, there is illustrated a generalized flowchart of monitoring process stability in accordance with certain embodiments of the presently disclosed subject matter.

A sequence of anomaly scores corresponding to a sequence of specimens can be generated (202) (e.g., by the anomaly detector 104 in the PMC 102). The sequence of specimens are production specimens that are sequentially fabricated and examined in the fab during a fabrication process thereof. A semiconductor specimen used herein can refer to, e.g., a wafer, a die, or parts thereof. By way of example, a sequence of wafers 1-$n$ can be sequentially fabricated by a fabrication process tool in the fab through a fabrication process that comprises multiple processing steps. A sampled set of processing steps can be selected therefrom for in-line examination, based on their known impacts on device characteristics or yield. Images of a wafer or parts thereof can be acquired at the sampled set of processing steps to be examined.

For purpose of illustration only, certain embodiments of the following description may be described with respect to a specific processing step/layer of the sampled set of processing steps. Those skilled in the art will readily appreciate that the teachings of the presently disclosed subject matter are also applicable to multiple processing steps of a specimen.

Specifically, for each given specimen in the sequence, an image of the given specimen (e.g., acquired by the examination tool 120) can be obtained (e.g., by the anomaly detector 104). An image of a specimen can refer to an image capturing at least part of the specimen. By way of example, an image can capture a given region or a given structure (e.g., a structural feature or pattern on a semiconductor specimen, such as, e.g., memory cells, contacts, etc.) that is of interest to be examined on a semiconductor specimen. For instance, the image can be an electron beam (e-beam) image acquired by an electron beam tool in runtime during in-line examination of the semiconductor specimen.

The image can be fed into the ML model 106. The ML model 106 is a trained ML model configured to process input images for pattern variation detection. Specifically, the image can be processed by the ML model and an anomaly map indicative of pattern variation in the image can be obtained (206) (e.g., by the anomaly detector 104). The pattern variation referred to herein can include variation related to any pattern, structure or image, such as, e.g., bent lines, edge roughness, surface roughness, CD variation/shift, missing pattern, gray level variation, etc. In some cases, the pattern variation can also include defect-related pattern distortion. It is to be noted that the pattern variation referred to herein should not be limited to any specific size or resolution. There may be considered a presence of "variation" if one or more measurements and/or detections indicate that one or more characteristics of a design formed on the specimen are outside of a desired range of values for those one or more characteristics.

As mentioned above, the ML model is previously trained during a training phase for pattern variation detection. In some embodiments, the ML model can be trained using unsupervised learning based on a training set comprising a plurality of training images where the majority represents normal pattern behaviors. As described above, the ML model used herein can be implemented as various types of machine learning models, as exemplified above.

By way of example, the ML model can be implemented as an autoencoder or variations thereof. Autoencoder is a type of neural network commonly used for the purpose of data reproduction by learning efficient data coding and reconstructing its inputs (e.g., minimizing the difference between the input and the output). The autoencoder has an input layer, an output layer, and one or more hidden layers connecting them. Generally, an autoencoder can be regarded as including two parts, the encoder and the decoder. The autoencoder learns to compress data from an input layer (i.e., the encoder part) into a short code in a low-dimensional latent space, and then decompress that code into an output that closely matches the original data (i.e., the decoder part). The output of the encoder is referred to as code, latent variables, or latent representation of the input image in the latent space. The code can pass the hidden layers in the decoder and can be reconstructed to an output image corresponding to the input image in the output layer.

Since the autoencoder is trained using training images representing normal patterns, the model learns to reconstruct the normal pattern behaviors based on the latent representation of the training images. Once the ML model is trained, the trained model is capable of generating, for each input image in runtime, a reconstructed output image that closely matches the input and represents the normal patterns thereof. The reconstruction error between the input image and the reconstructed image can be used to provide an anomaly map indicating pixel level probabilities of the presence of pattern variation in the input image.

It is to be noted that the training set used herein for training the ML model does not necessarily comprise only clean images (i.e., normal images free of pattern variations), as it is assumed that distorted/defective images are rare and sparse in distribution, and normal images tend to dominate the majority of the image populations. Thus, it is not required to specifically configure the training set by collecting only the clean images in the present disclosure. It has been proved by experiments that the trained ML model using such training set has satisfying detection performance in terms of accuracy and capture rate.

In some embodiments, the ML model can be implemented as a generative network, such as, e.g., a variational autoencoder (VAE). Taking the VAE as an example for illustration, the encoder of the VAE can be configured to map the input image to one or more neurons/latent variables in a latent space, each representing a respective feature extracted from the input image. The VAE can also model the probability distribution of each feature (e.g., a predetermined distribution based on the feature's characteristics), thereby allowing to visualize different levels of pattern variations impacting the feature.

By way of example, at least one latent variable in the latent space may represent a specific pattern variation of a structure in the image (e.g., a specific type of defect/distortion related to a structure/object). In such cases, for an image of a given specimen, the level of pattern variation of the structure in the image can be indicated based on the value of the at least one latent variable extracted from the latent space and the predefined probability distribution of the specific pattern variation. By way of example, in cases where it is identified that a latent variable/neuron in the latent space represents a specific defect feature related to a structure of the specimen, such as, e.g., a protrusion at the edge of a column structure, the level of defectivity of the structure can be indicated, e.g., by analyzing where the value of the latent variable falls within the entire probability distribution of the defect feature (in some cases, such distribution can be predefined based on the feature's characteristics).

Figure 7:
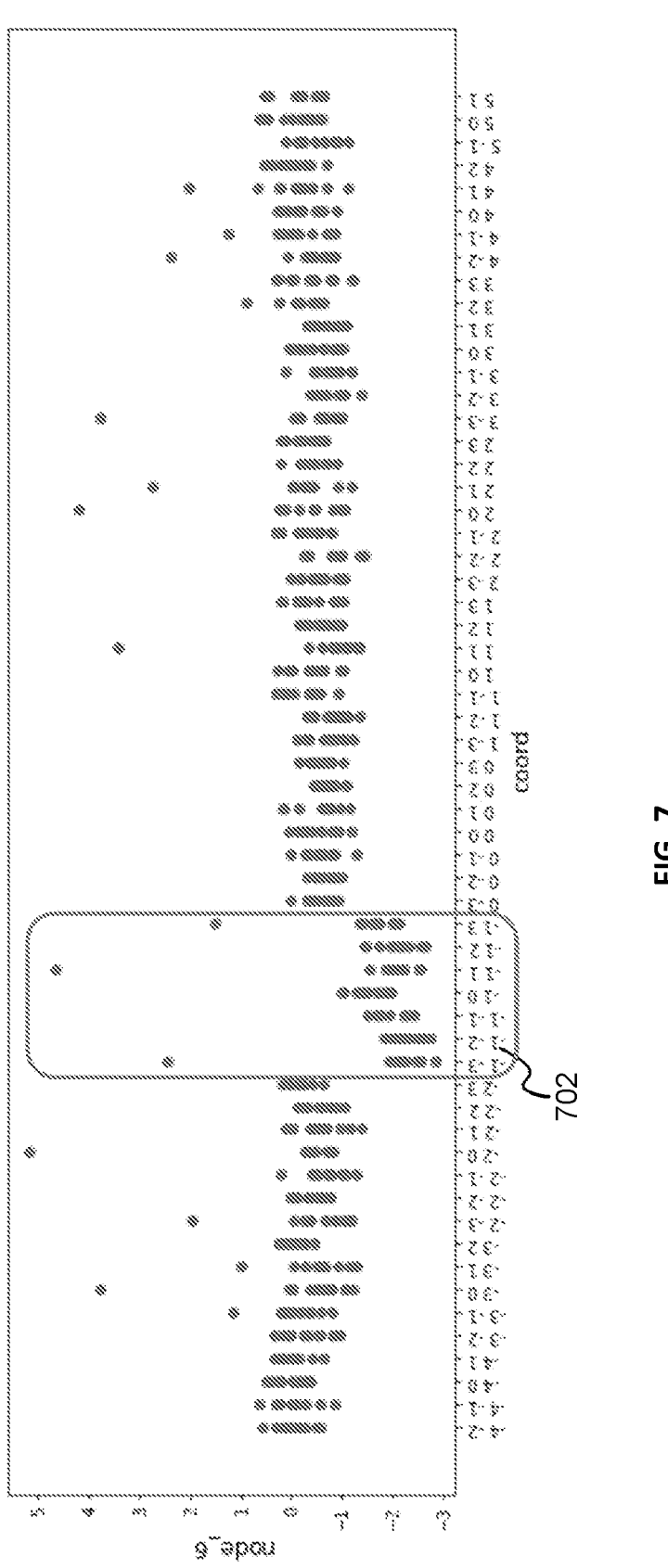
FIG. 7 illustrates an example of values of a specific neuron in the latent space representing a defect feature of a specimen in accordance with certain embodiments of the presently disclosed subject matter.

FIG. 7 illustrates an example of values of a specific neuron in the latent space representing a defect feature in various specimens in accordance with certain embodiments of the presently disclosed subject matter. Assume neuron 6 is identified as being related to a defect feature related to a column structure. The y axis in the graph of FIG. 7 represents the value of neuron 6, while x axis represents the coordinates (marked as "coord" in the graph) of different specimens (e.g., dies on a wafer). When processing an input image of certain specimens (such as dies at specific coordinates as illustrated in 702), it is found that the value of neuron 6 stands out of the regular distribution thereof. It can be indicated that there is likely to be a presence of this specific defect in these specimens. In some cases, two latent variables/neurons can be used in combination for the purpose of classification of different types of process variations/defect features.

In some embodiments, the indications provided by the latent variables can be used in combination with the output of the ML model, such as the anomaly maps and anomaly scores, and together provide a decision with respect to the level of process variation/defectivity.

It is to be noted that VAE is illustrated for purpose of exemplification only. Other types of generative networks, such as GAN, diffusion models, etc., that can be configured to map input images to latent variables in a latent space representing respective features extracted therefrom, can be used in addition to or instead of the VAE.

Continuing with the description of FIG. 2, an anomaly score can be derived (208) (e.g., by the anomaly score generator 108 in the PMC 102) based on the anomaly map, the anomaly score indicative of level of pattern variation presented in at least part of the given specimen. In some embodiments, the anomaly score can be derived at various levels/resolutions, such as, e.g., an image-level score, a structure-level score, and/or a pixel-level score. By way of example, the anomaly score can be calculated for one of the following: one or more pixels in the image, one or more structures represented in the image, or the image as a whole.

For instance, for an image capturing a structure of N-type metal-oxide-semiconductor (NMOS) logic that comprises sub-structures of a gate and two fins, an anomaly map can be obtained by the ML model, comprising pixel level probabilities of presence of pattern variation corresponding to the pixels in the image. In some cases, the anomaly score can be derived at a structure level, such as, e.g., for the NMOS structure, by aggregating/averaging the pixel level probabilities corresponding to pixels of the NMOS structure (or a region containing the structure) to obtain the score. Similarly, the anomaly score can be derived for the sub-structures, such as for the gate and/or the fins, by aggregating/averaging the pixel level probabilities corresponding to pixels of the sub-structures to obtain respective scores. In some other cases, the anomaly score can be derived at pixel level, e.g., for one or more specific pixels.

It is to be noted that when deriving the anomaly score, in some cases there is no need to apply a threshold to the pixel level probabilities of the anomaly map for the purpose of deriving an anomaly score and detecting pattern variations. This is because applying a predefined threshold may simply "cut off"/ignore the pixel values below the threshold which may bear valuable pattern information. Such thresholding fails to take full advantage of the entire image information offered by the raw capacity of the examination tool.

Although thresholding may work for certain defect-related anomaly detection, where the target defects usually present significantly stronger signal strength as compared to the normal non-defective patterns, such thresholding may not work as expected when it comes to detection of pattern variation in general, as certain pattern variations below the predefined threshold tend to be overlooked/buried, thus affecting detection sensitivities of the variations. In comparison, utilizing the full image information as currently proposed can make sure all pixels that bear pattern variation information (as indicated by the ML, model) are taken into consideration when deriving the detection results (e.g., the anomaly score indicative of level of process variation).

In particular, in cases where no apparent defects are present in the image (and corresponding specimen), thresholding-based defect detection will simply output a result of no anomalies, without providing any additional information/indication usable for purpose of process monitoring/prediction, whereas the process variation detection in the present disclosure provides a way of continuously monitoring process stability which can be used for providing defect related prediction, as described below.

In addition, in some cases, clustering can be performed based on the pixel-level probabilities of the anomaly map, where the identified clusters represent classification of different types of process variations/defects.

As described above, the anomaly score, as derived based on the anomaly map, is indicative of the level of pattern variation as presented in at least part of the given specimen (e.g., represented by one or more structures or one or more pixels of the image). According to certain embodiments, the anomaly score can be correlated with a defectivity score related to defect detection. The defectivity score is obtained in accordance with a defectivity metric representing a defect characteristic of a given defect, such as, e.g., defect density, defect count, etc., as described above with reference to FIG. 4. The anomaly score can be regarded as being obtained in accordance with an anomaly metric representing the level of pattern variation. The anomaly score/metric has higher detection sensitivity than the defectivity score/metric.

In some embodiments, the anomaly score is correlated with the defectivity score in a correlation relationship. Referring now to FIG. 3, there is shown a generalized flowchart of deriving a correlation relationship between a defectivity metric and an anomaly metric in accordance with certain embodiments of the presently disclosed subject matter.

Figure 6:
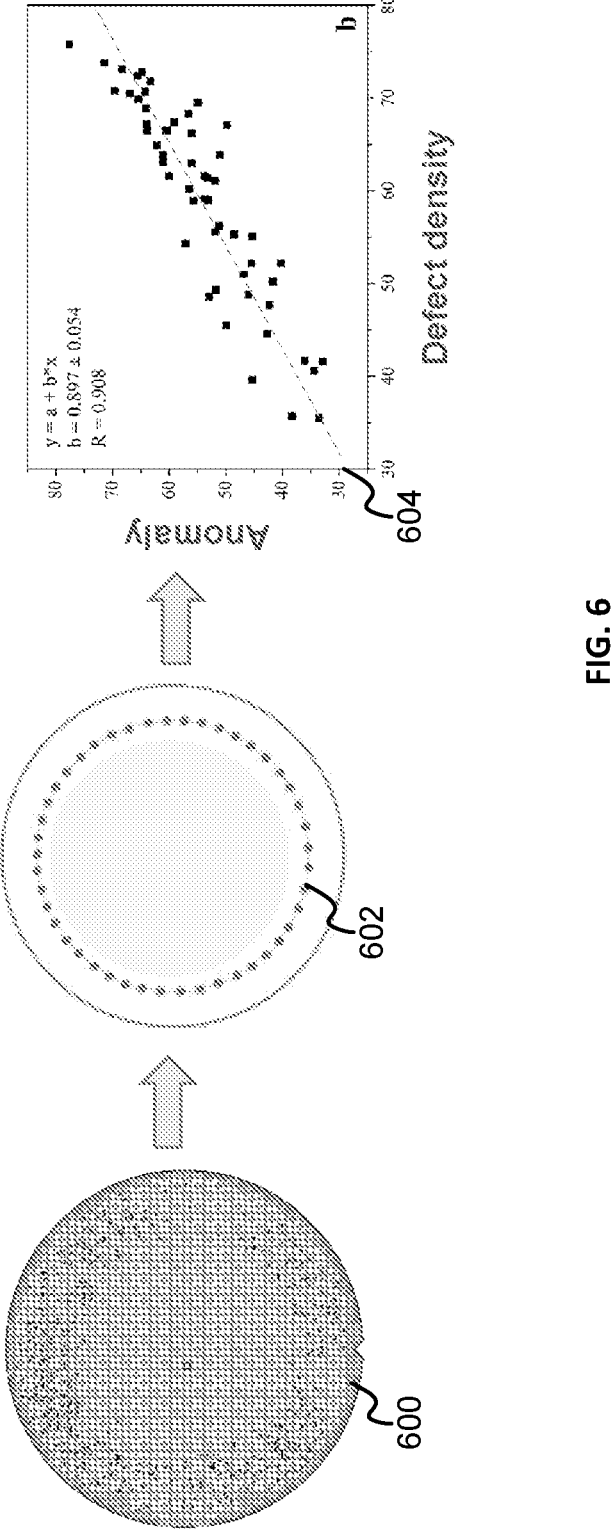
FIG. 6 is a schematic illustration of deriving a scatter plot illustrating a linear correlation relationship between corresponding anomaly metric and defectivity metric in accordance with certain embodiments of the presently disclosed subject matter.

Considering the rare appearance of low frequency defects, historical defect data can be collected (302) from a stack of specimens that were previously examined, so as to demonstrate the statistical distribution of the defects. The historical defect data can be represented in various forms, such as, e.g., a stacked defect map. By way of example, a defect map indicative of defect distribution can be obtained for each specimen. The defect map can be informative of a set of defects detected based on an image acquired for the specimen. Each defect of the defect map can be associated with one or more defect attributes, such as, e.g., location, strength, size, and shape of the defect, etc. Defect maps of the stack of specimens can be aggregated to form a stacked defect map. FIG. 6 shows a schematic illustration of an exemplary stacked defect map 600 obtained from a stack of wafers. It is to be noted that a defect map does not necessarily have to be represented in a map format. Any other appropriate format that can represent defect distribution and attributes of a specimen can be used instead.

Locations on the stack of specimens having high probability of presence of defects can be determined (304) based on the defect data. As illustrated, based on the defect map 600, it can be determined that the majority of defects are distributed in a circular region along the edge of the exemplary wafers.

Images of at least some of the locations can be processed (306) using the MIL model (such as the MIL, model 106 described above) to obtain anomaly maps and anomaly scores thereof, in a similar manner as described above with reference to FIG. 2. In FIG. 6, anomaly scores are obtained for at least some of the defect locations 602. The anomaly scores and corresponding defect data of these locations can be correlated (308) to derive a correlation relationship. Defectivity scores (such as a score representative of defect density) can be calculated for the locations, and pairs of anomaly scores and defectivity scores, each corresponding to a respective location, can be graphed together to form a scatter plot 604 where the x axis represents a defectivity score (e.g., defect density), and the y axis represents an anomaly score. As illustrated in the plot, the points fall along a line representing identification of a linear correlation relationship between corresponding anomaly scores/metric and defectivity scores/metric, which can be used for process monitoring and prediction purposes, as described below.

Continuing with the description of FIG. 2, the sequence of anomaly scores corresponding to the sequence of specimens can be analyzed (210) (e.g., by the process monitor 110 in the PMC 102) to monitor on-going process stability, thereby providing defect related prediction along the fabrication process based on the correlation relationship, as derived between the anomaly scores and the defectivity scores as described with reference to FIG. 3.

Figure 5:
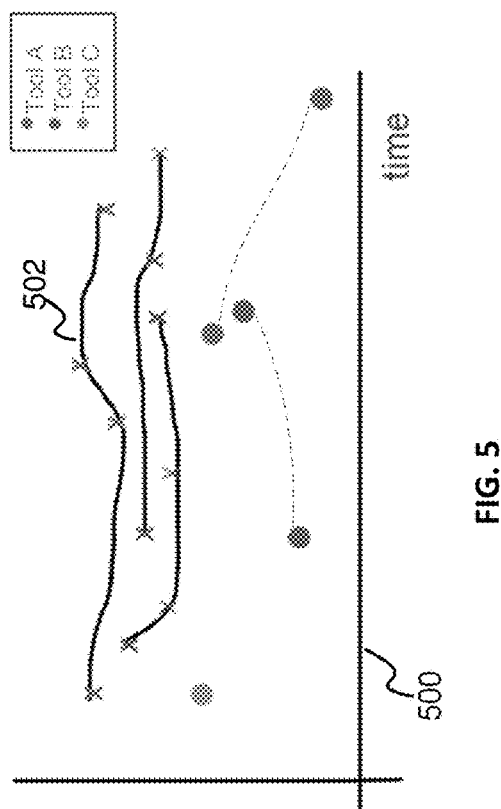
FIG. 5 shows an example of monitoring on-going process stability in accordance with certain embodiments of the presently disclosed subject matter.

FIG. 5 illustrates an example of monitoring on-going process stability in accordance with certain embodiments of the presently disclosed subject matter.

As described with reference to FIG. 4, the curves in graph 400 illustrate changes of a defectivity metric (e.g., defect density) of a sequence of semiconductor specimens (e.g., wafers) in the production line, which provides an on-going trend of defect presence when there are sufficient appearances of defects on these wafers.

In cases of low frequency defects whose appearances tend to be relatively rare, it can be difficult to construct a meaningful graph of defectivity metric. As exemplified in graph 500 of FIG. 5, the points connected by dash curves represent the same defectivity metric (as used in FIG. 4) for a sequence of specimens where the defects tend to be low frequency in their appearance (also referred to as low hit rate). As shown, not every specimen shows presence of such defects. For instance, tool A and tool B each captures two appearances of the defects in two wafers (connected by dash curves), while tool C captures only one appearance in one wafer. Such rare presence can barely construct a continuous curve for the purpose of on-going process monitoring.

In such cases, as proposed by the present disclosure, an anomaly metric which has higher detection sensitivity can be used instead of the defectivity metric. As illustrated in FIG. 5, the crosses connected by solid curves represent an anomaly metric for the same sequence of specimens having low frequency defects. Specifically, each cross represents an anomaly score of a specimen obtained in accordance with an anomaly metric indicative of pattern variation as described above with reference to FIG. 2. Since the anomaly metric aims to detect any type of pattern variation and has higher detection sensitivity, an anomaly score can always be obtained even in cases where there is no presence of the defects, therefore sufficient data points can be collected for constructing a continuous graph representative of the anomaly metric.

When analyzing the curves of anomaly scores, an on-going trend of pattern variation can be observed, which can be used for monitoring fabrication process stability. In addition, a defect related prediction, such as defect presence, can be provided for the present sequence of wafers, as well as the next wafers in line to be fabricated and examined, based on the correlation relationship between the anomaly metric and the defectivity metric. In some cases, an early alert of a possible defect presence can be provided when a trend of increasing pattern variation is detected.

In some cases, the presently proposed methodology is also referred to as "Die-2-Distribution" (as compared to the conventional Die-to-Die (D2D), Die-to-History (D2H), Die-to-Database (D2DB) as described above), where the distribution refers to the general pattern distribution as learnt by the ML model and is used as a reference when deriving the anomalies indicative of pattern variations.

In some embodiments, the sequence of specimens can refer to a sequence of dies on a wafer. In such cases the sequence of anomaly scores can be obtained for the corresponding dies, and analyzed for monitoring pattern variation uniformity (such as, e.g., CD uniformity) across the wafer.

In some embodiments, the sequence of specimens can refer to a sequence of wafers. In such cases the sequence of anomaly scores can be obtained for the corresponding wafers, and analyzed for monitoring process variation along the fabrication process of the sequence of wafers.

In some embodiments, the sequence of specimens comprises a plurality of subsequences of specimens respectively fabricated by a plurality of fabrication tools. In such cases, a plurality of subsequences of anomaly scores can be generated, corresponding to the plurality of subsequences of specimens, in a similar manner as described with reference to block 202. The plurality of subsequences of anomaly scores can be separately and collectively analyzed to verify the root cause of one or more pattern variations as indicated by some of the anomaly scores. By way of example, as illustrated in FIG. 5, the three solid curves represent on-going changes of anomaly scores for three subsequences of specimens respectively fabricated by three fabrication tools A, B and C. In cases of a specific pattern variation (or possible defect prediction), it can be determined based on the analysis of the three curves which tool may be the root cause of such variation. In some cases, a tool can be investigated if the corresponding anomaly metric curve illustrates a continuous higher level of anomaly as compared to other tools, such as, e.g., the curve 502 in FIG. 5 which shows a constantly higher anomaly metric than the other two curves. In such cases, tool A that is represented by curve 502 can be examined for identifying causes.

It is to be noted that the graphs in FIG. 5 can be constructed at different resolutions. For instance, instead of different tools, the anomaly metric curves can be constructed for different sub-sections of the tools (such as, e.g., chambers in the tools) and/or different tool recipes, for the purpose of identifying root causes.

It is to be noted that the process monitoring method and system as described above can be applied to different examination applications, such as, e.g., a metrology application, a defect detection application, and a defect review application. Accordingly, the images processed by the ML model can be acquired by different examination tools configured for different examination applications.

According to certain embodiments, the process as described above with reference to FIG. 2 can be included as part of an examination recipe usable by the examination system 100 and/or the examination tool 120 for online examination in runtime. It is to be noted that the term "examination recipe" should be expansively construed to cover any recipe that can be used by an examination tool for any examination application, including the embodiments as described above.

It is to be noted that examples illustrated in the present disclosure, such as, e.g., the exemplary defectivity/anomaly metrics, the exemplified ML model types and structures, the examination tools and applications, etc., are illustrated for exemplary purposes, and should not be regarded as limiting the present disclosure in any way. Other appropriate examples/implementations can be used in addition to, or in lieu of the above.

Among advantages of certain embodiments of the process monitoring system and method as described herein is that it enables continuous monitoring of process stability and providing defect related prediction, which is particularly advantageous in cases of insufficient defect presence for low frequency defects. This is enabled by detecting the level of pattern variations in images of specimens using an anomaly metric which has higher detection sensitivity than a defectivity metric, and deriving defect related prediction based on a correlation relationship between the anomaly metric and the defectivity metric.

Among further advantages of certain embodiments of the process monitoring system and method as described herein is that the anomaly map outputted by the ML model is not thresholded when deriving the anomaly score, so as not to overlook pattern variations below the predefined threshold, thus avoiding affecting detection sensitivities of such variations. Utilizing the full image information offered by the raw capacity of the examination tool as currently proposed can ensure all pixels that bear pattern variation information (as indicated by the ML, model) are taken into consideration when deriving the detection results.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

What is claimed is:

1. A computerized system of examining semiconductor specimens, the system comprising a processor and memory circuitry (PMC) configured to:

generate a sequence of anomaly scores corresponding to a sequence of specimens sequentially fabricated and examined during a fabrication process thereof, comprising, for each given specimen in the sequence:

obtaining an image of the given specimen acquired by an examination tool, using a machine learning (ML) model to process the image to generate an anomaly map comprising pixel level probabilities of presence of pattern variation in the image, wherein the ML model is previously trained during a training phase for pattern variation detection, and deriving, based on the anomaly map, an anomaly score indicative of a level of pattern variation presented in at least part of the given specimen, wherein the anomaly score is correlated with a defectivity score related to defect detection in a correlation relationship derived based on defect data collected from a stack of specimens previously examined, and wherein the anomaly score exhibits higher detection sensitivity than the defectivity score; and analyze the sequence of anomaly scores to monitor ongoing process stability, thereby providing a defect related prediction along the fabrication process based on the correlation relationship, and generate an alert of yield drop upon detection of a trend of increasing defect presence.

2. The computerized system according to claim 1, wherein the pattern variation relates to at least one of: bent lines, edge roughness, surface roughness, critical dimension (CD) variation, missing patterns, and gray level variation.

3. The computerized system according to claim 1, wherein the ML model is previously trained using unsupervised learning based on a training set comprising a plurality of training images of which a majority represents normal pattern behaviors without pattern variations.

4. The computerized system according to claim 1, wherein the defectivity score is obtained in accordance with a defectivity metric representing a defect characteristic.

5. The computerized system according to claim 1, wherein the correlation relationship is derived by: collecting defect data from the stack of specimens previously examined, determining locations on the stack of specimens with a presence of defects based on the defect data, processing images of at least some of the locations using the ML model to obtain anomaly maps and anomaly scores thereof, and correlating the anomaly scores and corresponding defect data to derive the correlation relationship.

6. The computerized system according to claim 1, wherein the sequence of specimens is a sequence of dies on a wafer, and the sequence of anomaly scores are analyzed for monitoring pattern variation uniformity across the wafer.

7. The computerized system according to claim 1, wherein the sequence of specimens is a sequence of wafers, and the sequence of anomaly scores are analyzed for monitoring process variation along the fabrication process of the sequence of wafers.

8. The computerized system according to claim 1, wherein the sequence of specimens comprises a plurality of subsequences of specimens respectively fabricated by a plurality of fabrication tools, and the generating comprises generating a plurality of subsequences of anomaly scores corresponding to the plurality of subsequences of specimens, and the analyzing comprises separately and collectively analyzing the plurality of subsequences of anomaly scores to verify a root cause of one or more pattern variations indicated by one or more anomaly scores.

9. The computerized system according to claim 1, wherein the anomaly score is derived based on the anomaly map for one of: one or more pixels in the image, one or more structures represented in the image, or the image as a whole.

10. The computerized system according to claim 1, wherein the ML model is a variational auto-encoder (VAE) configured to map the image to one or more latent variables in a latent space each representing a respective feature extracted from the image, and model a probability distribution of each feature, thereby allowing to visualization of different levels of pattern variations impacting the feature.

11. The computerized system according to claim 10, wherein at least one latent variable in the latent space represents a specific pattern variation of a structure in the image, and wherein the PMC is further configured to provide an indication of the level of pattern variation of the structure based on a value of the at least one latent variable extracted from the latent space and the probability distribution of the specific pattern variation, and determine the level of pattern variation of the structure based on the indication and the anomaly score derived for the structure.

12. A computerized method of examining semiconductor specimens, the method comprising:

generating a sequence of anomaly scores corresponding to a sequence of specimens sequentially fabricated and examined during a fabrication process thereof, comprising, for each given specimen in the sequence:

obtaining an image of the given specimen acquired by an examination tool, using a machine learning (ML) model to process the image to generate an anomaly map comprising pixel level probabilities of a presence of a pattern variation in the image, wherein the ML model is previously trained during a training phase for pattern variation detection, and deriving, based on the anomaly map, an anomaly score indicative of a level of pattern variation presented in at least part of the given specimen, wherein the anomaly score is correlated with a defectivity score related to defect detection in a correlation relationship derived based on defect data collected from a stack of specimens previously examined, and wherein the anomaly score exhibits higher detection sensitivity than the defectivity score; and analyzing the sequence of anomaly scores to monitor on-going process stability, thereby providing defect related prediction along the fabrication process based on the correlation relationship, and generate an alert of yield drop upon detection of a trend of increasing defect presence.

13. The computerized method according to claim 12, wherein the ML model is previously trained using unsupervised learning based on a training set comprising a plurality of training images of which a majority represents normal pattern behaviors without pattern variations.

14. The computerized method according to claim 12, wherein the correlation relationship is derived by: collecting defect data from the stack of specimens previously examined, determining locations on the stack of specimens with a presence of defects based on the defect data, processing images of at least some of the locations using the ML model to obtain anomaly maps and anomaly scores thereof, and correlating the anomaly scores and corresponding defect data to derive the correlation relationship.

15. The computerized method according to claim 12, wherein the sequence of specimens is a sequence of dies on a wafer, and the sequence of anomaly scores are analyzed for monitoring pattern variation uniformity across the wafer.

16. The computerized method according to claim 12, wherein the sequence of specimens is a sequence of wafers, and the sequence of anomaly scores are analyzed for monitoring process variation along the fabrication process of the sequence of wafers.

17. The computerized method according to claim 12, wherein the sequence of specimens comprises a plurality of subsequences of specimens respectively fabricated by a plurality of fabrication tools, and the generating comprises generating a plurality of subsequences of anomaly scores corresponding to the plurality of subsequences of specimens, and the analyzing comprises separately and collectively analyzing the plurality of subsequences of anomaly scores to verify a root cause of one or more pattern variations indicated by one or more anomaly scores.

18. The computerized method according to claim 12, wherein the ML model is a variational auto-encoder (VAE) configured to map the image to one or more latent variables in a latent space, each representing a respective feature extracted from the image, and model a probability distribution of each feature, thereby allowing to visualization of different levels of pattern variations impacting the feature.

19. The computerized method according to claim 18, wherein at least one latent variable in the latent space represents a specific pattern variation of a structure in the image, and wherein the method further comprises providing an indication of the level of pattern variation of the structure based on a value of the at least one latent variable extracted from the latent space and the probability distribution of the specific pattern variation, and determining the level of pattern variation of the structure based on the indication and the anomaly score derived for the structure.

20. A non-transitory computer readable storage medium tangibly embodying a program of instructions that, when executed by a computer, cause the computer to perform a method of examining semiconductor specimens, the method comprising:

generating a sequence of anomaly scores corresponding to a sequence of specimens sequentially fabricated and examined during a fabrication process thereof, comprising, for each given specimen in the sequence:

obtaining an image of the given specimen acquired by an examination tool, using a machine learning (ML) model to process the image to generate an anomaly map comprising pixel level probabilities of a presence of a pattern variation in the image, wherein the ML model is previously trained during a training phase for pattern variation detection, and deriving, based on the anomaly map, an anomaly score indicative of a level of pattern variation presented in at least part of the given specimen, wherein the anomaly score is correlated with a defectivity score related to defect detection in a correlation relationship derived based on defect data collected from a stack of specimens previously examined, and wherein the anomaly score exhibits higher detection sensitivity than the defectivity score; and analyzing the sequence of anomaly scores to monitor on-going process stability, thereby providing defect related prediction along the fabrication process based on the correlation relationship, and generate an alert of yield drop upon detection of a trend of increasing defect presence.

\*    \*    \*    \*    \*